C. H. ROTH.
TOOL OR CUTTER HEAD.
APPLICATION FILED NOV. 8, 1918.
1,327,881.
Patented Jan. 13, 1920.
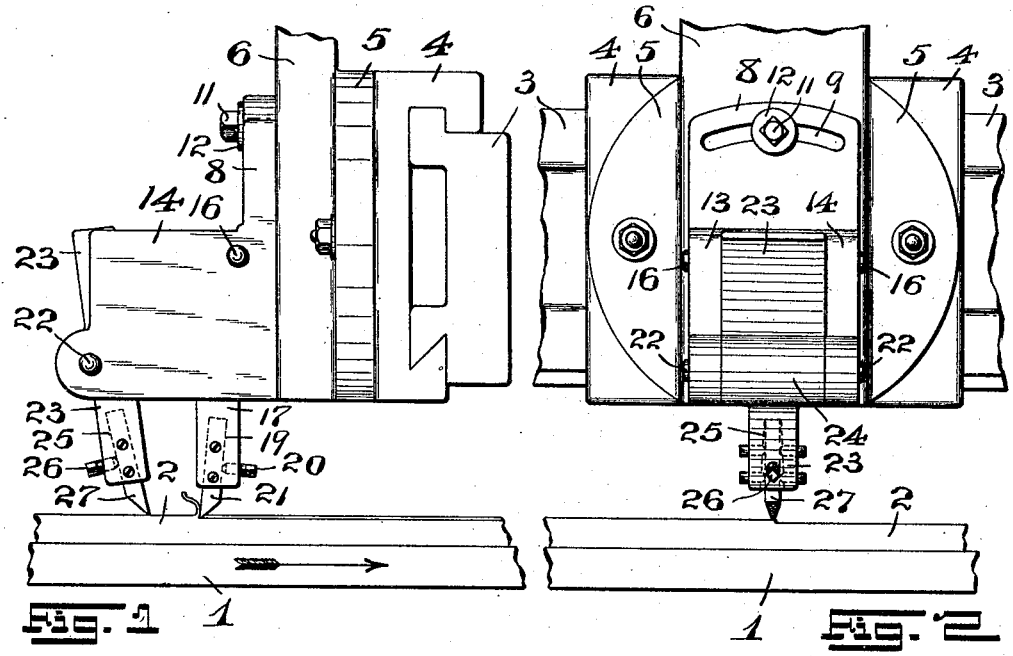
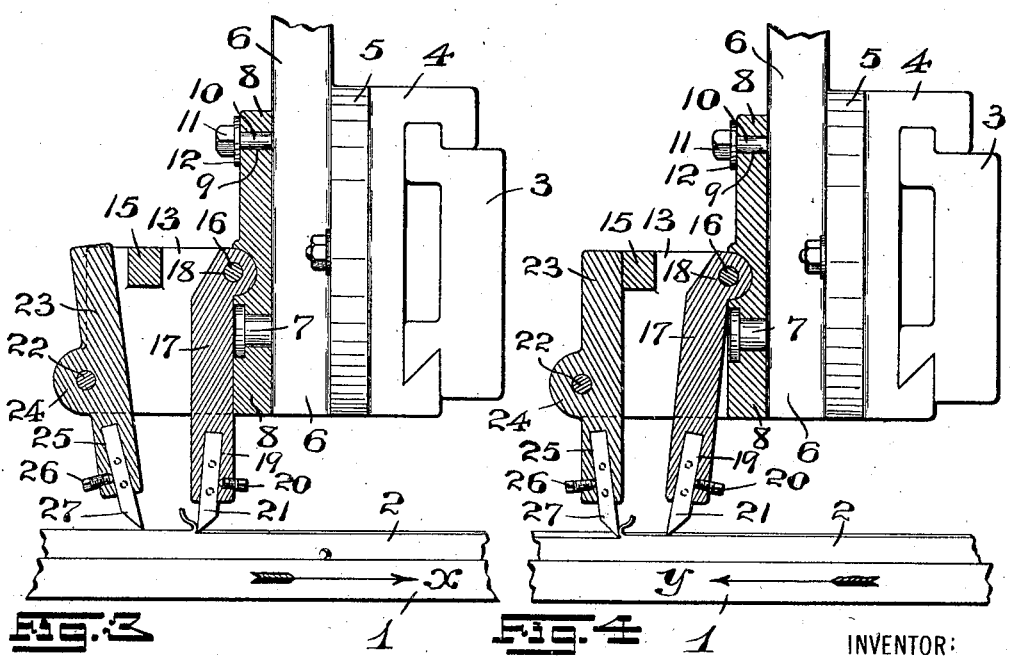
INVENTOR:
Carl H. Roth,
BY
Fraentzel and Richards,
ATTORNEYS.

UNITED STATES PATENT OFFICE.

CARL H. ROTH, OF NEWARK, NEW JERSEY.

TOOL OR CUTTER HEAD.

1,327,881. Specification of Letters Patent. Patented Jan. 13, 1920.

Application filed November 8, 1918. Serial No. 261,601.

*To all whom it may concern:*

Be it known that I, CARL H. ROTH, subject of the Emperor of Germany, residing at Newark, in the county of Essex and State of New Jersey, have invented certain new and useful Improvements in Tool or Cutter Heads; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in cutting tools; and, the present invention has reference, more particularly, to improvements in that class of cutting tools or mechanism, known in the art as planers and shaping machines, with a view of providing in connection with the usual constructions of such machines a tool-holder and a movably disposed or reciprocatory bed or table upon which the work is mounted.

The present invention, therefore, has for its principal object to provide in connection with tools or machines of the general character above stated, a cutting tool-holder provided with a suitably constructed tool-box in which are pivotally mounted a plurality of cutter-retaining elements, placed and operating in such a manner, that the work which is mounted upon the reciprocatory bed or table, as it moves back and forth, will have its surface, cut or planed during each movement of the work-carrying table or bed, so that there will be no loss of work during the return-movement of the table or bed, as is the case with the constructions of planers, or shapers now in use.

Other objects of the present invention not at this time more particularly enumerated will be clearly understood from the following detailed description of the present invention.

With the above-stated objects of the present invention in view, the said invention consists, primarily, in a sliding head for such machines, provided with a novel construction of tool-box and a plurality of cutters mounted in connection with such tool-box in such a manner, so that the results which embody the principles of the present invention will be produced in an efficient manner, and by means of a simple arrangement and construction of cutter-holding members.

The invention is clearly illustrated in the accompanying drawings, in which:—

Figure 1 is a side elevation of a sliding head of the character above-stated, the same being provided with a tool-box and an arrangement of more than one cutter, showing one embodiment of the principles of the present invention, said view representing also in side elevation a fragmentary portion of the work-supporting table or bed and the work mounted thereon.

Fig. 2 is a front elevation of the various parts illustrated in said Fig. 1.

Figs. 3 and 4 are similar views of the same parts, with the tool-box and the cutter-retaining elements, however, being represented in vertical section, said Fig. 3 showing one cutter in action during the rearward movement of the table or bed and its work, and Fig. 4 showing another cutter in action during the forward movement of the table or bed and its work.

Similar characters of reference are employed in the said above described views, to indicate corresponding parts.

Referring now to the said drawings, the reference-character 1 indicates a portion of the reciprocatory table or bed of a planer, or shaper, upon which is suitably mounted a piece of work, as 2. The reference-character 3 indicates the usual cross-bar or slideway upon which is slidably mounted, so as to be moved laterally, the saddle 4 of the sliding head. Suitably connected with said saddle is the usual swing-frame 5 provided with the slider 6 and the usual mechanism, not here shown, for producing the movements vertically of the sliding head. Extending forwardly from said slider 6 is a pivot-post or stud 7 upon which is pivotally mounted, for angular adjustment, the main plate 8 of the tool-box, said plate being provided in its upper portion with an arc-shaped opening or slot 9, into and through which projects a set-screw 10, extending forwardly from said slider, and provided with a head 11 and washer or collar 12 for tightening the said main plate 8 in its pivotally adjusted relation, as will be clearly evident from an inspection of the several figures of the drawings. Extending forwardly from the said main plate 8 are suitably disposed wall-members, as 13 and 14, said wall-members being joined at the proper location by a cross-member or bar, as 15, or other suitable means which will provide a stop for the purpose to be presently described. Connecting the said wall-members 13 and 14, and extending across the space between said members, is a rod 16 upon which is oscillatorily mounted an eye-portion 18 of a cutter-holder 17, the rearwardly swinging movement of said holder 17 in the direction of the arrow X, see Fig. 3, being limited and arrested by the rear face of said holder being brought into contact with the face-portion of said main plate 8 located between said wall-members 13 and 14, as shown in said Fig. 3. The lower portion of the said holder, which projects below the space between said wall-members 13 and 14, is provided with a suitably formed cutter or tool-receiving socket, as 19, in which is secured and held by means of a binding or set-screw 20, a suitably formed tool or cutter 21, in such a manner that the cutting edge of the same, when the table or bed moves in the direction of the arrow X, will be brought into operative cutting action with the work upon said table or bed, but will swing out of said cutting action when the table or bed moves in the direction of the arrow Y, as indicated in Fig. 4 of the drawings. Connecting the said wall-members 13 and 14 is another rod 22 upon which is oscillatorily mounted an eye-portion 24 of a second cutter or tool-holder 23, the upper portion of which is adapted to be brought into arrested engagement with the stop 15, when the table or bed moves in the direction of the arrow Y, as shown in Fig. 4 of the drawings.

The lower portion of the said holder 23, which projects below the space between said wall-members 13 and 14, is also provided with a suitably formed cutter or tool-receiving socket, as 25, in which is secured and held by means of a binding or set-screw 26, a suitably formed tool or cutter 27, in such a manner that the cutting edge of the same, when the table or bed moves in the direction of the arrow Y, in said Fig. 4, will be brought into operative cutting action with the previously cut surface-portion of the work, but will swing out of said cutting action when the table or bed moves in the direction of the arrow X, as indicated in said Fig. 3 of the drawings.

Thus, it will be seen, that with each forward and rearward movement of the table or work, and with the proper and usual vertical adjustment of the slider, both cutters perform their work alternately, so that there will be no loss of time, and the surface of the work is cut, planed, or shaped, in just one-half the time, as is ordinarily the case with the usual tool or cutter-arrangement as now employed with milling machines, planers, or shapers.

I claim:—

In a tool or cutter-head for planers or shapers, in combination with the slider, a tool-box comprising a main plate and forwardly extending wall-members having a receiving space between them, said wall-members being provided at the upper marginal edge-portions near said main plate with a rod extending across said space, and said wall-members being further provided at the lower portions of the front marginal edge-portions with another rod, a cutter-holder provided at its upper edge with an eye for oscillatorily mounting said holder upon said first-mentioned rod, and a second cutter-holder provided with a centrally disposed eye for oscillatorily mounting said last-mentioned cutter-holder upon said second-mentioned rod, said first-mentioned cutter-holder during the movement of the machine-table or bed in one direction bearing against said main plate, and a cross-bar connected at its ends with the upper marginal portions of said wall-members and extending across the receiving space between said wall-members, and with which cross-bar the upper end-portion of said second-mentioned cutter-holder is adapted to be brought into fixed engagement during the movement of the machine-table or bed in the opposite direction, and means connected with each cutter-holder for securing a cutter-tool to each holder.

In testimony that I claim the invention set forth above I have hereunto set my hand this 30th day of October, 1918.

CARL H. ROTH.

Witnesses:
 FREDK. C. FRAENTZEL,
 BARBARA W. SUTTERLIN.